和2,762,799

MANUFACTURE OF HEXAMETHYLENE-TETRAMINE

Fritz Meissner, Rodenkirchen, near Koln, and Ernst Schwiedessen, Koln-Marienburg, Germany, assignors to Josef Meissner, Koln-Bayenthal, Germany, a German firm No Drawing. Application July 3, 1953, Serial No. 366,064

Claims priority, application Germany July 4, 1952

1 Claim. (Cl. 260—248.6)

Hexamethylenetetramine is produced on reacting formaldehyde with ammonia, in accordance with the following equation:

$$6CH_2O + 4NH_3 \rightarrow C_6H_{12}N_4 + 6H_2O$$

Hitherto, the two components have been used in a more or less concentrated form, the formaldehyde mostly as a 30 to 40% aqueous solution and the ammonia in the gaseous or liquid form or in aqueous solution. In these known processes, more or less dilute solutions of hexamethylenetetramine were obtained, the evaporation of which to solid hexamethylenetetramine requires a considerable consumption of heat.

It has already been proposed to utilise a portion of the heat of reaction in order to save steam used for heating, but, according to this proposal, the greater part of the heat necessary for evaporation still had to be supplied from an external source.

According to the invention, solid hexamethylenetetramine is obtained directly without using additional steam or other external supply of heat. The heat that is necessary for the evaporation is supplied by the total heat generated by absorption, solution and reaction in the formation of the hexamethylenetetramine. However, if desired, a smaller portion of the resulting quantities of heat may be utilised, so that solid hexamethylenetetramine is not produced, but a concentrated solution of hexamethylenetetramine is obtained as the final product.

As is known, in all the plants used at the present time for the production of formaldehyde, the formaldehyde leaves the customary contact oven as a part of a mixture of gas and steam. Now, the formaldehyde is dissolved out of this mixture of gas and steam in large washing and absorption plants. It has been found that it is possible to react the formaldehyde contained in the waste gas of the contact oven, without previously isolating it, in the presence of a liquid medium, with ammonia, with a practically quantitative yield of hexamethylenetetramine. This fact is quite surprising, since even the most modern plants for the production of hexamethylenetetramine have still to be worked with 30 to 40% aqueous solutions of formaldehyde and nobody guessed that gases, which contain only comparatively small quantities of formaldehyde, could be reacted to give practically quantitative yields of hexamethylenetetramine.

It has already been proposed to react the formaldehyde, contained in mixtures of gases, with ammonia in the gaseous phase, hexamethylenetetramine separating on the walls of the vessel. However, that process has merely a theoretical significance and has not been introduced into practice, since the conversion is not quantitative and the yield, as regards space and time, is poor, and also the elimination of the heat of reaction involves very great difficulties. It is only when, according to the invention, the reaction of the formaldehyde, contained in the mixture of gases, with ammonia is carried out in the presence of a liquid medium that the aforesaid difficulties can be obviated and a quantitative yield of hexamethylenetetramine can be obtained.

The basic idea of the process according to the invention and the special method of utilising the heat of reaction are explained in the following examples:

Example 1

An aldehyde-containing mixture of gas and steam, such as is evolved from, for example, a contact oven for the production of formaldehyde, and the quantity of ammonia that corresponds to the quantity of aldehyde are passed into a reaction vessel which is filled with a solvent, for example water. The formaldehyde and the ammonia react to form hexamethylenetetramine, and the gases and vapours evolved leave the apparatus through a column with a reflux condenser fitted thereon. The principal reaction takes place in the reactor. Unreacted parts of the reaction components react to completion in the column. The quantity of ammonia is advantageously regulated in such a manner with known measuring and regulating instruments that a small quantity of ammonia is contained in the waste gases. In these circumstances, the waste gases are practically free from formaldehyde and from compounds containing formaldehyde. The conversion of the formaldehyde into hexamethylenetetramine is practically quantitative. The yield is also practically quantitative when calculated on the ammonia. The losses of ammonia that occur amount to about 1%.

The heat of reaction generated first causes an increase of temperature up to the boiling point of the solution of the reaction mixture and then the evaporation of a corresponding quantity of solvent.

By the term "boiling point" is to be understood the temperature at which the vapour pressure of the solvent is equal to or greater than the partial pressure of the solvent in the gaseous phase before the change of substance takes place in the reactor. The reaction temperature can be controlled by choosing suitable pressure conditions or by the addition of air or other inert gases.

A continuous concentration of the hexamethylenetetramine therefore takes place in the reaction solution until the formation of a concentrated solution and, further, until the precipitation of solid hexamethylenetetramine. The excess of heat of reaction can be compensated by controlling the reflux of the column or can be utilised in some way, for example by evaporating the methanol, that is required for the production of formaldehyde, in a double jacket arranged round the reaction apparatus.

For the continuous carrying out of the process according to the invention, the reaction solution is, for example in a cycle, pumped back into the reaction apparatus by centrifuging or suction.

Example 2

The process is carried out in accordance with the particulars given in Example 1, but the operations of reaction and evaporation are carried out as two separate operations, i. e., the reaction is to take place beneath the boiling point of the reaction mixture.

The reaction solution is pumped continuously into a second device in which self-evaporation of the reaction solution and precipitation of the solid hexamethylenetetramine take place with cooling. This self-evaporation is obtained by reducing the pressure or by passing air or other inert gas through the solution.

In order to separate the solid hexamethylenetetramine, the reaction solution is pumped back into the reaction device through suction filters, centrifuges or the like.

The process according to the invention may be varied in various ways. Thus, for example, in discontinuous working, the same device can be used as reactor and then for concentrating the solution.

Example 3

The process is carried out as in Example 2, but the heat of reaction is supplied indirectly to the evaporating apparatus which is being worked under reduced pressure or by passing inert gases therethrough. The reaction solution passes from the reaction apparatus to the evaporator, for example through an overflow. The removal of the separated solid hexamethylenetetramine can again be effected by re-pumping, or with the employment of suction filters, centrifuges or the like.

The transmission of the heat of reaction to the evaporator may be effected in a known manner, for example with the employment of liquids as carriers of heat, which liquids are pumped back through coiled pipes which are fitted in the reaction device and in the evaporator. Alternatively, the reaction device is constructed in such a manner that a part of the walls of the reaction device is, at the same time, a cooling surface for the reaction device and a heating surface for the evaporator. For example, for this purpose, a double jacket may be put round the reaction device and can be used as evaporator or the reaction device may be formed as a circulating heater for the evaporator.

By means of the process according to the invention, various advantages are obtained as compared with the earlier processes.

1. The process does not require any heat from an external source.
2. The bulky and expensive absorption plants for the production of formaldehyde are dispensed with.
3. By means of the absorption water for the formaldehyde, there are generally dragged, into the reaction solutions, impurities which become concentrated on evaporation and, consequently, render the final product impure; this disadvantage is obviated with certainty by the process according to the invention.
4. If, in addition to hexamethylenetetramine, the production of a solution of formaldehyde is desired, a part of the formaldehyde, which is contained in the mixture of gas and steam of the contact oven, can be absorbed very simply in front of the reaction apparatus, whilst the residues, which are absorbable only with difficulty, are worked up into hexamethylenetetramine. In processes in which the waste gases of the contact oven are comparatively poor in formaldehyde, for example in the production of formaldehyde from methane, this possibility is particularly advantageous.
5. If it is desired, on the production of formaldehyde, to recover the unreacted methanol, methanol free from formaldehyde, can, without difficulty, be washed out of the waste gases of the reaction device, whereas, in the usual and known processes, it is, owing to the formation of hemiacetals (reaction of formaldehyde with methanol), possible to separate formaldehyde and methanol only with difficulty.

We claim:

A process for the production of solid hexamethylenetetramine or a concentrated solution of hexamethylenetetramine in substantially quantitative yield, which comprises bringing formaldehyde-containing gases into contact with ammonia in the presence of an aqueous solvent without supplying extraneous heat whereby the formaldehyde and ammonia react substantially quantitatively with liberation of heat and formation of hexamethylenetetramine and residual gases, the said formaldehyde-containing gases being proportioned with respect to the ammonia so that the residual gases contain unreacted ammonia, whereby said residual gases contain substantially no unreacted formaldehyde, said reaction being carried out at elevated temperature engendered solely by said liberated heat and evaporating said solvent from the reaction mixture solely by the direct action of the heat generated by absorption, solution and reaction in connection with the formation of the hexamethylenetetramine.

References Cited in the file of this patent

UNITED STATES PATENTS

| | | |
|---|---|---|
| 2,449,040 | Schideler | Sept. 7, 1948 |
| 2,542,315 | Eickmeyer | Feb. 20, 1951 |

FOREIGN PATENTS

| | | |
|---|---|---|
| 156,136 | Great Britain | May 30, 1922 |

OTHER REFERENCES

Karrer: Org. Chem., 1947, pp. 158, 3rd ed.